(12) United States Patent
Sagayaraj et al.

(10) Patent No.: US 9,113,317 B2
(45) Date of Patent: Aug. 18, 2015

(54) INTELLIGENT STREAMING TO A MOBILE DEVICE

(71) Applicant: VERIZON PATENT AND LICENSING INC., Basking Ridge, NJ (US)

(72) Inventors: Maria M Sagayaraj, Chennai (IN); NarayanaDhoss Gopalakrishnan, Chennai (IN); Ganesh Ramasamy, Chennai (IN); Poothabalan Somasundaram, Tirunelveli (IN); Krishnakumar Sundaram, Erode (IN); Sundar Sivaraman, Tirunelveli (IN); Arunkumar Surulinathan, Tamilnadu (IN); Habeeb Abdulquiyum, Thondi (IN); Saravanan Vijaykumar, TamilNadu (IN); Manjunathan Ramanathan, Vellore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 205 days.

(21) Appl. No.: 13/720,637

(22) Filed: Dec. 19, 2012

(65) Prior Publication Data
US 2014/0173051 A1    Jun. 19, 2014

(51) Int. Cl.
*H04W 4/18* (2009.01)
*H04L 29/06* (2006.01)

(52) U.S. Cl.
CPC ............. *H04W 4/18* (2013.01); *H04L 65/4076* (2013.01); *H04L 65/4084* (2013.01); *H04L 65/602* (2013.01); *H04L 65/605* (2013.01)

(58) Field of Classification Search
CPC ........ H04H 60/90; H04H 60/91; H04L 47/14; H04L 65/00; H04L 65/4076; H04L 65/4084; H04L 65/4069; H04L 65/60; H04L 65/601–65/605; H04M 2250/12; H04M 2250/22; H04W 4/18
See application file for complete search history.

(56) References Cited

U.S. PATENT DOCUMENTS

| | | | |
|---|---|---|---|
| 2007/0091836 A1* | 4/2007 | Oprescu-Surcobe et al. | 370/318 |
| 2012/0023256 A1* | 1/2012 | Chen et al. ................... | 709/231 |
| 2012/0260170 A1* | 10/2012 | Bhogal et al. ................. | 715/716 |
| 2013/0073734 A1* | 3/2013 | Bedingfield et al. .......... | 709/226 |
| 2013/0151722 A1* | 6/2013 | Alameh et al. ................ | 709/231 |
| 2014/0095664 A1* | 4/2014 | Prakash et al. ................ | 709/219 |

\* cited by examiner

*Primary Examiner* — Brian J Gillis
*Assistant Examiner* — Gil H. Lee

(57) ABSTRACT

Intelligent streaming of multimedia content is provided. Based on various conditions and signals detected by a mobile device, an activity state of the mobile device that indicates whether viewing of a video portion of streaming multimedia content is desirable or likely may be determined. A server streaming the multimedia content, upon receiving from the mobile device either a request to eliminate the video portion streaming multimedia content or a status update that the video portion is not viewable or is not likely being viewed, is configured to replace streaming of the multimedia content with both audio and video portions with streaming of the multimedia content containing the audio portion but without the video portion.

20 Claims, 8 Drawing Sheets

INTELLIGENT STREAMING TO A MOBILE DEVICE

BACKGROUND

In recent years, streaming of multimedia content through digital data networks to user terminal devices has expanded and increased in popularity around the world. Many services enable a user to stream music, movies, or other media stored on servers directly to the user's computer or set top box. The media may be transmitted via one or more networks using various networking technologies.

However, streaming content consumes considerable network resources. Video content requires an especially large amount of network resources since video content often contains a video portion as well as a corresponding audio portion. The increasing popularity of streaming multimedia content places high demands on the networks that carry the streaming media to user devices, which in turn requires the network operators to deploy additional resources to stream video content.

With the increased sophistication of mobile networks and the increased consumer usage of mobile wireless data services, the recent trend is for the network service providers to replace unlimited data plans with service plans in which the cost to the customer is based on usage, e.g. the amount of data communication through the network to/from a mobile device. In some cases, a user may enter into an agreement with a service provider and/or a network operator to obtain a limited amount of data service through a mobile network to a user's mobile device in exchange for a monthly fee, with more data being available at an additional cost. Accordingly, a user may be discouraged from streaming videos to the user's mobile device for fear of incurring additional costs.

Hence a need exists for reducing the network resources used to stream video content in order to reduce the demands put on a network when the video content is streamed and/or reduce the amount of a user's data used to stream the video content.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Streaming of multimedia content that includes both a video component and an associated audio component through digital data networks to user terminal devices has become common and popular. As noted, however, streaming content consumes considerable network resources. Situations arise in which a user begins receiving such content but for a time only experiences or wishes to experience the audio portion of the desired program. For example, a user may still be listening to the audio component of the multimedia content, but is viewing other items of interest or is otherwise not viewing the video component of the multimedia content.

Where the user's terminal is a mobile device, the amount of data that the network delivers to the device is often measured and used to bill the subscriber for the data service through the network. To conserve network resources (and possibly reduce data consumption that is billable to the user), when a user's activity (or lack thereof) on a mobile device indicates that the user is not viewing a video, only the audio portion of that video is streamed. The user's activity can include for example, placing a mobile device face down, switching from one active window (playing the video) to another window, minimizing the active window (playing the video), closing a laptop or clam-shell type mobile device, and so on.

Figure 1:
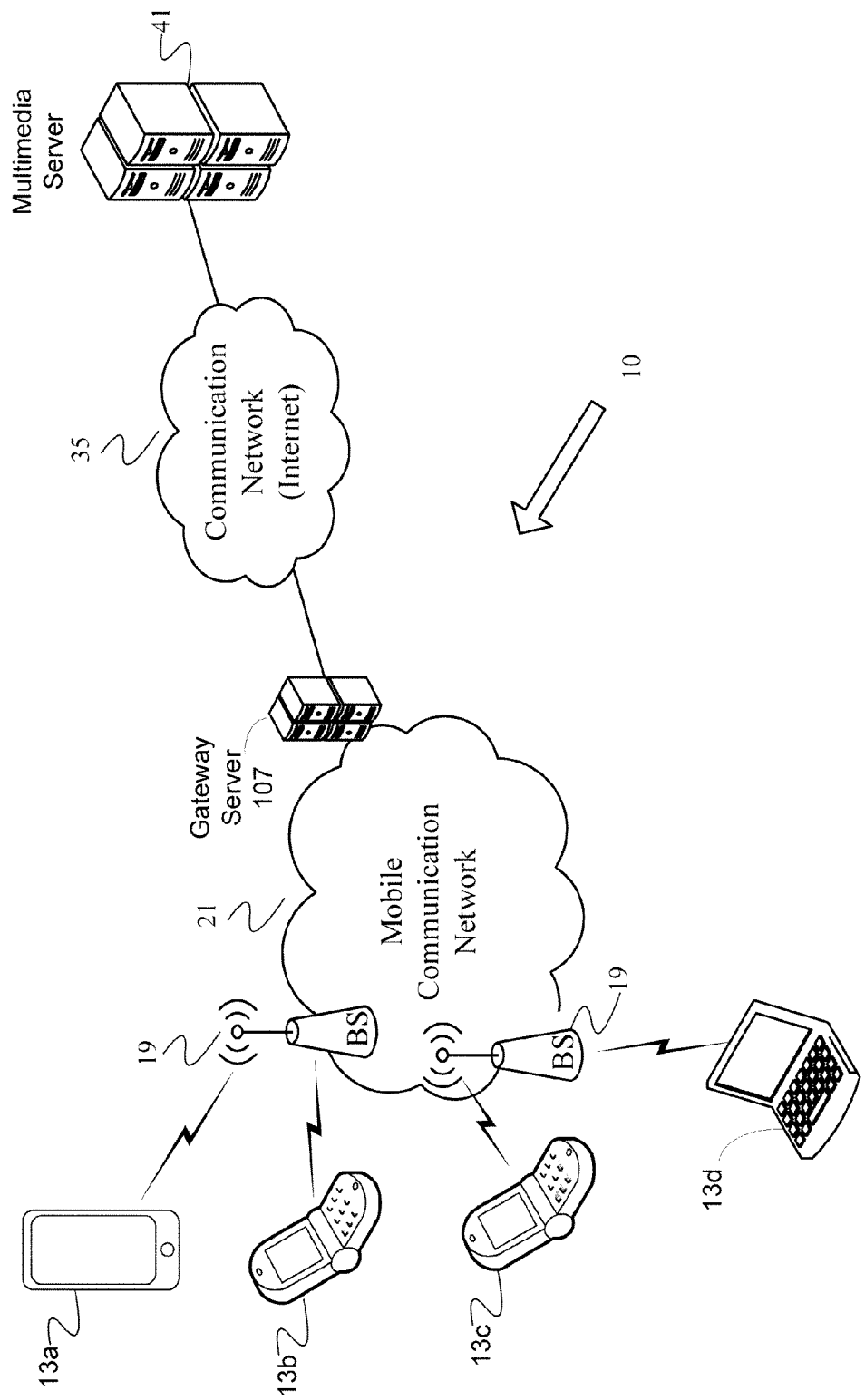
FIG. 1 is a simplified functional diagram that illustrates an exemplary network environment that may be involved in providing intelligent streaming of multimedia content to a user's mobile device.

Reference now is made in detail to the examples illustrated in the accompanying drawings and discussed below. FIG. 1 is a diagram that illustrates an example of a network environment 10 that may provide intelligent streaming of multimedia content to a device. The network environment 10 in FIG. 1 includes a mobile communication network 21 that is coupled to one or more servers (e.g., multimedia server 41) through another communication network 35 such as the Internet. Although reference numeral 21 in FIG. 1 is shown as a mobile communication network, aspects of the examples of intelligent multimedia content streaming described below may apply to or in the context of other communication networks or sub-networks as well.

The mobile communication network 21 may be operated by a carrier or service provider to provide a wide range of mobile communication services and ancillary services or features to its subscriber customers and associated device users. The elements generally indicated by the reference numeral 21, the base stations 19, and mobile devices 13a to 13d, server 107 are elements of the mobile communication network 21 and are operated by or on behalf of the carrier, although the devices 13a to 13d typically are sold to the carrier's customers. The network environment 10 provides communications between the devices 13a to 13d as well as communications for the mobile devices 13a to 13d with networks and stations outside the mobile communication network 21.

For purposes of later discussion, several users' mobile devices 13a to 13d appear in the drawing, to represent examples of the devices that may receive various services via the network environment 10. Today, many devices are mobile devices that take the form of portable handsets, smart-phones, tablet computers, or personal digital assistants (PDAs), although they may be implemented in other form factors, including consumer and business electronic devices. In FIG. 1, for example, mobile devices 13a, 13b, 13c, and 13d may be in the form of a smart-phone or tablet, a portable handset, or a laptop configured to communicate wirelessly with the mobile communication network 21.

In other examples (not shown in FIG. 1), devices that communicate with the mobile communication network 21 may include more stationary devices such as desktop computers that operate in much the same way as mobile devices 13a to 13d. The desktop computers may include application such as browsers or other applications capable of streaming multimedia content. Subscriber customers may also use these more stationary devices to access the communication services and ancillary services provided by the communication network operated by or on the behalf of the carrier.

The network environment 10 may allow users of at least some of the mobile devices to initiate and receive communications such as telephone calls to each other as well as through the public switched telephone network (PSTN) and telephone stations connected thereto. In the example, the network environment 10 also offers a variety of data services via the communication network 35 (e.g., the Internet), such as downloads, web browsing, e-mail, multimedia content, etc. The network environment 10 typically is implemented by a number of interconnected networks. Hence, the network environment 10 may also include a number of radio access networks (RANs), as well as regional ground networks interconnecting a number of Radio Access Networks (RANs) and a wide area network (WAN) interconnecting the regional ground networks to core network elements, such as the Multimedia Messaging Service Centers (MMSCs). A regional portion of the network environment 10, such as that serving mobile devices 13a to 13d will typically include one or more RANs and a regional circuit and/or packet switched network and associated signaling network facilities.

Physical elements of a RAN, operated by one of the mobile service providers or carriers, include a number of base stations represented in the example by the base stations (BSs) 19. Such base stations 19 typically comprise a base transceiver system (BTS) which communicates via an antennae system at the site of base station and over the airlink with one or more of the wireless devices 13a to 13d when the wireless devices are within range. Each base station 19 typically includes a BTS coupled to several antennae mounted on a radio tower within a coverage area often referred to as a "cell." The BTS is the part of the radio network that sends and receives radio frequency (RF) signals to/from the wireless devices that the base station currently serves. The radio access networks also include a traffic network represented generally by the mobile communication network 21, which carries the user communications for the mobile devices 13a to 13d between the respective base stations 19 and other elements with or through which the mobile devices 13a to 13d communicate. Individual elements such as switches and/or routers forming the traffic network 21 are omitted here for simplicity.

The mobile communication network 21 portion of the network environment 10 connects to a packet switched data communication network 35, such as the network commonly referred to as the "Internet." Although not shown, network 21 may also connect to other packet networks, such as private intranets of the carrier and/or other third parties that offer content to mobile device users. Packet switched communications via the traffic network 21 and the Internet 35 may support a variety of user services through the network environment 10, such as mobile device communications of text and multimedia messages, e-mail, web surfing or browsing, programming and multimedia downloading and streaming (including audio and video), etc. For example, the mobile devices may be able to receive data (e.g., multimedia content) from one or more servers. FIG. 1 shows one such server, multimedia server 41, by way of example. The multimedia server 41 may be implemented on a single hardware platform. However, to provide effective streaming of content to a large number of mobile devices, the multimedia server 41 for the associated example of streaming content may utilize a distributed system architecture.

The content provided by the multimedia server 41 discussed herein may be sent to various mobile devices using the mobile communication network 21 (e.g., a packet data network (PDN)) by User Datagram Protocol (UDP). The Evolved Packet Core (EPC) of network 21 uses the concept of Evolved Packet System (EPS) bearer channels to route IP traffic from a gateway server 107 in the network 21 to the mobile device (e.g. 13a to 13d). A bearer channel is an IP packet flow with a defined quality of service (QoS) between the Packet Data Network (PDN) Gateway (PGW) server 107 and the mobile device (e.g., 13a to 13d). It is within these packets that the data is sent to a mobile device (13a to 13d). For example, the mobile device (13a to 13d) receives data (e.g., multimedia content) via a unicast wireless network communication channel.

The gateway server 107 may be configured to determine data usage for the account associated with the mobile device 13a. Thus, data packets received by gateway server 107 addressed to or originating from the mobile device 13a may be counted by the gateway server 107 for account billing purposes. It should be noted that while a single gateway server 107 is illustrated in FIG. 1 for simplicity, different types of gateway servers may be used for different wireless technologies. For example, a high availability (HA) server can be used for 3G; a PGW server for 4G; general packet radio service core network (GGSN) for 2G, 3G, and wideband code division multiple access (WCDMA); etc. The different types of gateway servers are collectively referred to herein as "gateway server 107." Also, the counts are typically collected and processed through other systems (not shown) for bill processing or account debiting.

Using the network environment 10, a user on a mobile device may request or may be sent multimedia content to be streamed on the user's mobile device. The multimedia content may includes video content and audio content that is associated with the video content. In some cases, however, the user may not be actively viewing the multimedia content. Accordingly the resources of the network environment 10 may be conserved and/or the data consumed by (and possibly billed to) the user may be reduced by stopping the streaming of the video portion of the multimedia content while continuing the streaming of the audio portion of the multimedia content.

Figure 2:
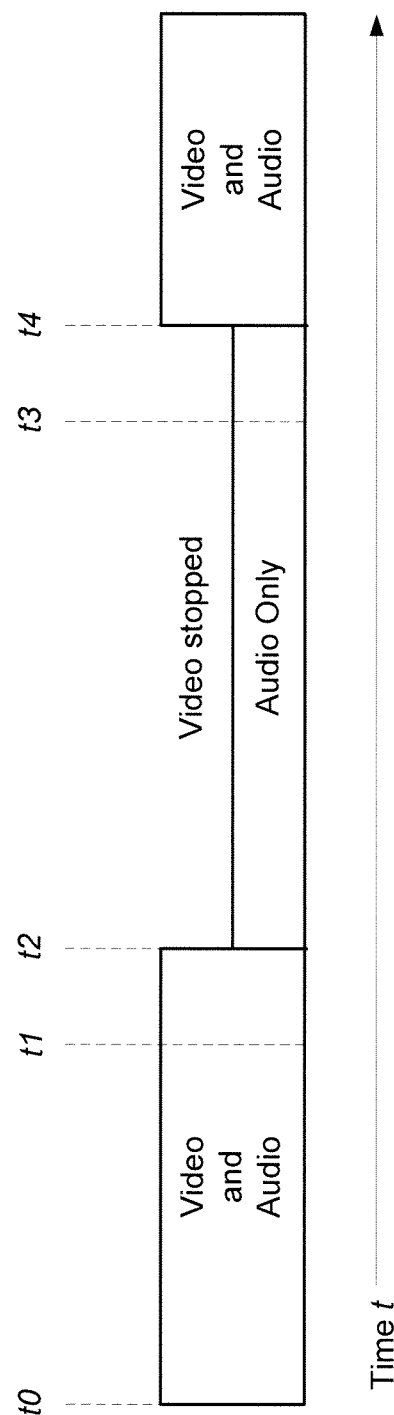
FIG. 2 is a timing diagram that illustrates an example of data communicated for streaming multimedia content based on an intelligent streaming scheme.

FIG. 2 is a timing diagram that illustrates an example of data communicated for streaming multimedia content based on an intelligent streaming scheme. The mobile device receives, from the server, streaming multimedia content that includes both video content and associated audio content starting at time t0, and provides the multimedia content to a display for displaying the video content and a speaker for outputting the associated audio content. At time t1, the mobile device determines that the current activity state of the device indicates that the user is not viewing or does not wish to view the video portion of the multimedia content. Accordingly, the mobile device can work with the server, so that the server stops the transmission of video portion of the multimedia content to the mobile device through the network, while the server continues to stream audio portion only through the network starting from time t2. In the example illustrated in FIG. 2, the playing of the multimedia content is not halted or restarted. Instead, playing of the multimedia content continues with only the audio portion instead of both the audio and video portions.

In one example, a delay may occur between the time when the video portion of the multimedia content (that occurs at a time before t1) and the time when the mobile device (or another system) determines that the video portion of the multimedia content is to be stopped (t1). This delay may be dependent on how often the mobile device, or a component of the mobile device, checks for conditions that may be used to determine whether the video portion of the multimedia content is to be stopped.

FIG. 2 also shows an additional delay between time t1 and time t2. This delay may represent the amount of time that elapses between determining that the video portion of the multimedia content is to be stopped and actually stopping the displaying of the video portion of the multimedia content. In some cases, the delay may also include some time used to coordinate the changing from one version of the multimedia content with both video and audio portions to the audio only version of the multimedia content in a smooth manner such that the user does not have a jarring experience. In some implementations, however, the delay between time t1 and time t2 may be nonexistent or at least imperceptible to the user.

If the current activity state of the mobile device changes to indicate that the user is viewing or wishes to view the video portion of the multimedia content (e.g., at time t3), the mobile device can work with the server to resume the transmission of the video portion of the multimedia content to the mobile device while continuing to stream the audio portion starting from time t4. The playing of the multimedia content is not halted or restarted. Instead, playing of the multimedia content continues with both the audio and video portions instead of only the audio portion.

The delay between time t3 and time t4 may represent the amount of time that elapses between determining that the streaming of the video portion of the multimedia content is to be resumed and actually resuming the displaying of the video portion of the multimedia content. The delay may also include some time used to coordinate the changing from one version of the multimedia content to another version in a smooth manner such that the user does not have a jarring experience. As with the delay between time t1 and time t2, the delay between time t3 and time t4 may be nonexistent or at least imperceptible to the user.

Figure 3:
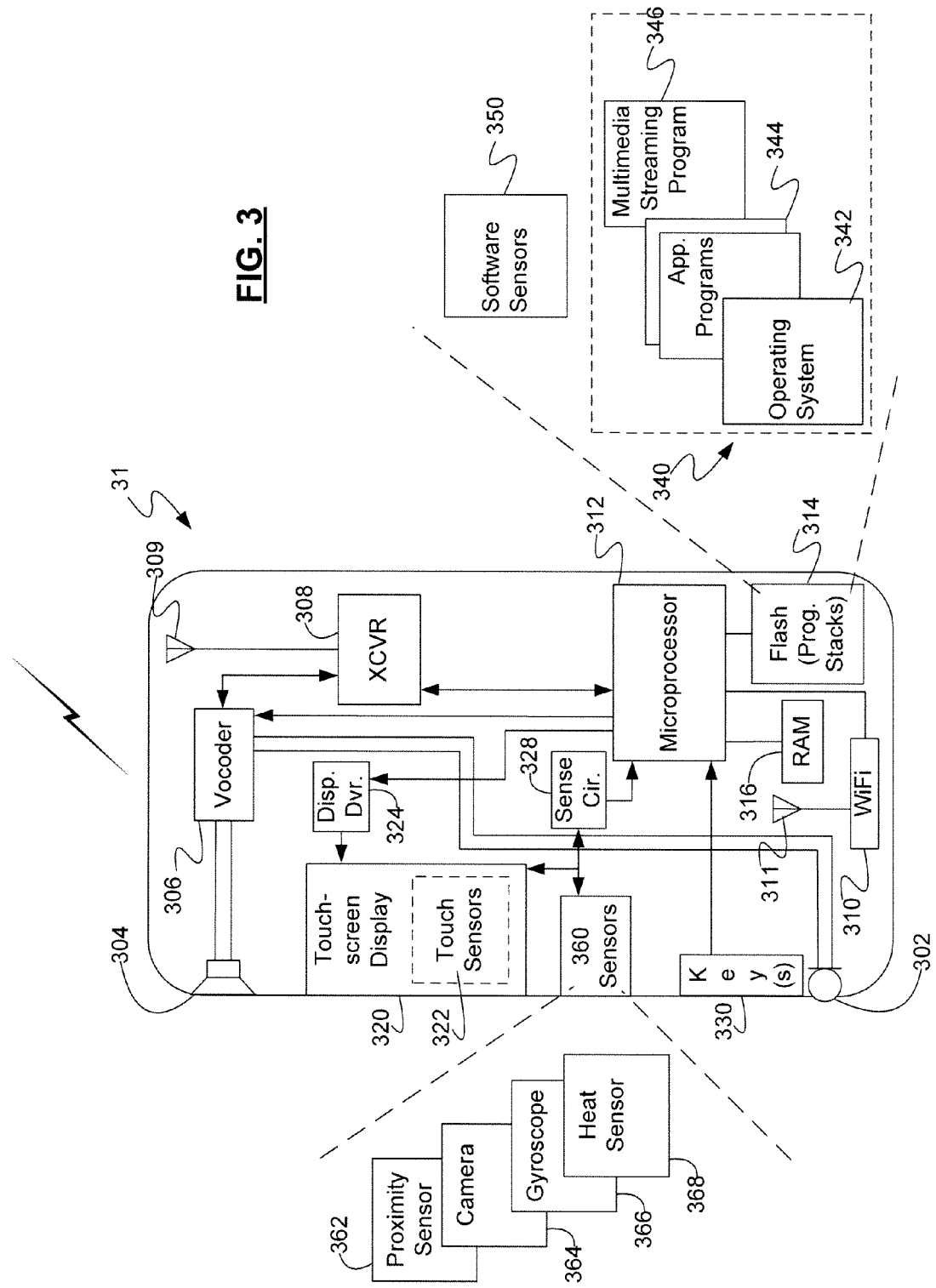
FIG. 3 is a block diagram illustrating an exemplary mobile device configured to support intelligent streaming of multimedia content for a user.

FIG. 3 is a block diagram illustrating, at a relatively high level, an exemplary mobile device 31 configured to provide intelligent streaming of multimedia content for a user. It should be appreciated that the disclosed subject matter may be implemented using any mobile computing device having computing capability and mobile communication capability, configured to use those capabilities to conduct operations such as, for example, receiving multimedia content, providing at least video and audio portions of the multimedia content, and coordinating transitions from streaming one version of multimedia content to streaming another version of multimedia content, as discussed herein.

In the example of FIG. 3, the mobile device 31 is in the form of a smart phone type mobile handset including a touch screen display, similar to the device 13a of FIG. 1. Examples of touch screen type mobile devices that may be used to implement mobile device 31 may include, but are not limited to, a smart phone, personal digital assistant (PDA), tablet computer, or other portable device with mobile communication capability. However, the structure and operation of the touch screen type mobile device 31 is provided by way of example; and the subject technology as described herein is not intended to be limited thereto. For purposes of this discussion, FIG. 3 provides a block diagram illustration of the exemplary mobile device 31 having a touch screen display for displaying content and receiving user input as or as part of the user interface.

Although the operations that are the focus of discussions here will utilize data communications, a typical mobile device such as the exemplary smart phone 31, will also support voice communications. Hence, in the example shown in FIG. 3, mobile device 31 includes a microphone 302 for audio signal input and a speaker 304 for audio signal output. The microphone 302 and speaker 304 are communicatively coupled to a voice or audio encoder/decoder (vocoder) 306. For a voice telephone call, for example, the vocoder 306 provides two-way conversion between analog audio signals representing speech or other audio and digital samples at a compressed bit rate compatible with the digital protocol of wireless telephone network communications or voice over packet (Internet Protocol) communications. The vocoder, speaker and microphone may also be used as elements of the user interface during other operations of the device, including some types of data communications.

Also, as shown in FIG. 3, the mobile device 31 includes at least one digital transceiver (XCVR) 308, for digital wireless communications via a wide area wireless mobile communication network, although the mobile device 31 may include additional digital or analog transceivers (not shown). The transceiver 308 conforms to one or more of the various digital wireless communication standards utilized by modern mobile networks. Examples of such transceivers include, but are not limited to transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." In an example, transceiver 308 provides two-way wireless communication of information including, digitized audio signals, still image and/or video signals, web page information for display as well as web related inputs, and various types of mobile message communications to/from the device.

Several of these types of communications through the transceiver and a network, as discussed later, will relate to intelligent streaming of multimedia content. Communications related to initializing the stream, coordinating the data stream, and receiving the multimedia content, for example, will often utilize Internet Protocol (IP) packet data transport utilizing the digital wireless transceiver (XCVR) 308 and over the air communications to and from base stations of the serving mobile network. Such communications may be used in the context of specific mobile device applications or operating device functions. Transceiver 308 also sends and receives a variety of signaling messages in support of various voice and data services provided by a network of a wireless service provider, to a user of mobile device 31 via the mobile communication network. Transceiver 308 connects through radio frequency (RF) send-and-receive amplifiers (not separately shown) to an antenna 309.

Many modern mobile devices also support wireless local area network communications over WiFi, instead of or in addition to data communications using the wide area mobile communication network. Hence, in the example of FIG. 3, for packet data communications, the exemplary device 31 also includes a WiFi transceiver 310 and associated antenna 311. Although WiFi is used here as the example, the transceiver 310 may take the form of any available two-way wireless local area network transceiver of a type that is compatible with one or more standard protocols of communication implemented in wireless local area networks, such as one of the WiFi standards under IEEE 802.11 and/or WiMAX. The transceiver 310, for example, may provide two-way data transport for wireless communication with a wireless access point in a residence or enterprise that the user frequents or with any available hotspot offered in a public venue. Although communicating through a different network or networks, the transceiver 310 supports various types of data communications similar to the packet data communications supported via the mobile network transceiver 308, including communications that may relate to streaming multimedia content.

WiFi, as in the illustrated example, has been widely adopted for wireless local area network communications, e.g. currently over distances of up to about 100 meters or so. Although this range is somewhat shorter than that available from mobile networks via the transceiver 308, the wireless local area network communications typically incur no or lower data usage charges than the communications via the transceiver 308 using the mobile network.

Mobile device 31 further includes a microprocessor (or "processor") 312, which serves as a programmable controller for mobile device 31 by configuring mobile device 31 to perform various operations, for example, in accordance with instructions or programming executable by processor 312. Such operations may include, for example, various general operations of mobile device 31 as well as operations implemented by execution of various applications that have been installed on the mobile device 31. For purposes of the present discussion, the mobile device operations implemented by processor execution of appropriate programming also include operations related to streaming multimedia content and related operations as described herein.

A flash memory 314 is used to store, for example, programming or instructions such as the multimedia streaming program, for execution by the processor 312. Depending on the type of device, the mobile device 31 will store and run an operating system through which the mobile device applications may be run on the device. Examples of operating systems include Android, Apple iOS (I-Phone or iPad devices), Windows Mobile, RIM BlackBerry operating system, or the like. The programming in the flash memory will also include one or more application programs configured for execution on the processor 312 via or in cooperation with the specific operating system. Flash memory 314 may also be used to store mobile configuration settings for different mobile device applications or services executable at mobile device 31 (using processor 312). Mobile device 31 may also include a non-volatile random access memory (RAM) 316 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming for the processor, which configure the mobile device 31, may include software (e.g., a browser, an operating system feature, a media player, etc.) that is configured to stream multimedia content, as described herein. The software aspects of the technology may be thought of as "products" or "articles of manufacture" typically in the form of executable code or process instructions and/or associated data that is stored on or embodied in a type of machine or processor readable medium.

A mobile device under consideration here may include a variety of different types of user interface elements. For discussion purposes, in the smart phone example shown in FIG. 3, the user interface elements of mobile device 31 include a touch screen display 320 (also referred to herein as "touch screen 320" or "display 320"). For the purposes of displaying visual content, the touch screen 320 will include a display screen, such as a liquid crystal display (LCD) or the like. For input purposes, touch screen display 320 includes a plurality of touch sensors 322. Other interface elements may include a keypad including one or more keys 330. For example, the keypad may be implemented in hardware as a T9 or QWERTY keyboard of mobile device 31 and keys 330 may correspond to the physical keys of such a keyboard. Alternatively, keys 330 (and keyboard) of mobile device 31 may be implemented as "soft keys" of a virtual keyboard graphically represented in an appropriate arrangement via touch screen display 320. The soft keys presented on the touch screen display 320 may allow the user of mobile device 31 to invoke the same user interface functions as with the physical hardware keys. In some implementations, the microphone 302 and speaker 304 may be used as additional user interface elements, for audio input and output, including with respect to some functions related to streaming multimedia content, as described herein.

For output, touch screen display 320 is used to present information (e.g., text, video, graphics or other visible content) to the user of mobile device 31. Processor 312 controls visible display output on the LCD or other display element of the touch screen display 320 via a display driver 324, to present the various visible outputs to the device user. For example, multimedia streaming software may cause the processor 312 to operate the driver 324 to cause screen 320 to display the video content portion of multimedia content that the device receives as a stream via the network. The one or more speakers 304 also is/are part of the user interface for output purposes. For audio output, e.g. from the audio portion of multimedia content that the device receives as a stream via the network, the programming executed by the processor 312 causes audio data to be supplied to the vocoder for decoding and conversion to signals to drive the speaker(s) 304 to output the appropriate audio.

In general, touch screen display 320 and touch sensors 322 (and one or more keys 330, if included) are used to provide the textual and graphical user interface for the mobile device 31. In an example, touch screen display 320 provides viewable content to the user at mobile device 31. Touch screen display 320 also enables the user to interact directly with the viewable content provided in the content display area, typically by touching the surface of the screen with a finger or an implement such as a stylus.

In some implementations, touch screen display 320 is a capacitive touch screen display and touch sensors 322 are independent capacitors arranged as a grid and disposed at various points throughout a transparent conductive material (e.g., indium tin oxide) that is layered onto a hard surface composed of insulating material (e.g., glass). As another example, the respective locations of touch sensors 322 (e.g., capacitors) may correspond to different intersection points of a matrix of rows and columns of the layered conductive material. Alternatively, touch sensors 322 may include a grid of capacitive electrodes formed of one or more layers of transparent conductive material etched onto a sheet of hard insulating material, as described above. However, it should be noted that touch screen display 320 is not limited to either of the above-described implementations. Accordingly, touch screen display 320 may be implemented using any of various conventional or other techniques based on, for example, the type of capacitive touch screen technology desired for a particular implementation. User input includes touch of the display device with the user's finger, stylus or similar type of peripheral device used for user input with a touch screen. When current is applied to touch screen display 320, user input can be detected by touch sensors 322 based on a measurable change (e.g., reduction) in mutual capacitance based on measurable changes in capacitance and voltage at one or more individual sensor locations corresponding to the physical point(s) of contact of the user's finger(s) or conductive stylus with respect to touch screen display 320.

As shown in FIG. 3, mobile device 31 also includes a sense circuit 328 coupled to touch sensors 322 for detecting the occurrence and relative location/position of each touch with respect to a content display area of touch screen display 320. In this example, sense circuit 328 is configured to provide processor 312 with touch-position information based on user input received via touch sensors 322. In some implementations, processor 312 is configured to correlate the touch position information to specific content being displayed within the content display area on touch screen display 320. The touch-position information captured by sense circuit 328 and provided to processor 312 may include, but is not limited to, coordinates identifying the location of each detected touch with respect to the display area of touch screen display 320 and a timestamp corresponding to each detected touch position.

The information provided by sense circuit 328 may include, for example, a series of different locations of touch points/positions detected across the content display area of touch screen display 320 over a predetermined period of time. The location and time information for a series of continuous touch points/positions can be used by processor 312 to track the movement of the user's finger(s) (or other input device) across touch screen display 320. This information also may be used to track various parameters including, but not limited to, the direction and speed of finger movement based on changes between the different touch positions over time. The information tracked by sense circuit 328 is used by processor 312 to detect various points of touching as well as different types of touch gestures, for enabling the processor 312 and thus the device 31 to perform operations in accordance with each touch or touch gesture, including any related to operations or the like with respect to streaming multimedia content, as described herein.

The logic implemented by the processor 312 of the mobile device 31, in the example, by the microprocessor 312, configures the processor to control various functions as implemented by the mobile device 31. The logic for a processor may be implemented in a variety of ways, but in our example, the processor logic is implemented by programming, such as a multimedia streaming program, for execution by the microprocessor 312. The programming may take a variety of forms; and depending on the general program architecture, aspects relating to operations performed by the multimedia streaming program may be implemented in various ways. For example, the functions for multimedia streaming could be implemented using a special module in the operating system and/or as a standalone application program.

Hence, the example includes a number of programs 340, including the operating system (OS) 342, a number of applications 344 and a multimedia streaming program 346, stored in the flash memory 314 for execution by the microprocessor 312. While in this example the multimedia streaming program 346 is discussed as a separate program 340, the multimedia streaming 346 may also be part of the OS 342; or the functions of the multimedia streaming program 346 may be implemented as a library or other type of modules embedded in each application program 344 intended to utilize multimedia media streaming for reception of associated content for presentation to the user of the device 31. An application 344 may be installed at the mobile device 31 based on install data for the application. Install data includes data and/or other types of information that is used to install, or setup, the application for initial use at the mobile device 31 before user-specific configuration or personalization is applied. The install data may itself be programming which when executed by the microprocessor 312 installs the application for use at the mobile device 31.

The execution of the multimedia streaming program 346 by the microprocessor 312, in the example, enables the mobile device 31 to receive multimedia content that includes video content and associated audio content through the wireless mobile data communication network and provide the received video content and associated audio content via the at least one user interface element. The multimedia streaming program 346 may further configure the processor 312 to identify an activity state of the mobile device 31. If the activity state indicates that the mobile device 31 is operating in a manner to observe audio output but not video output, the processor 312 may be configured to send a message through the wireless mobile data communication network to initiate a change to a stream comprising the audio content but not the video content. If the activity state changes again, indicating user operation the mobile device in a manner to observe video output, the program 346 enables the processor 312 to send a message through the wireless mobile data communication network to initiate a change to a stream comprising the video content as well as the audio content, so as to resume streaming of the video content through the wireless mobile data communication network for receipt by the user's mobile device.

Each device may further be enhanced with one or more sensors 360 configured to detect one or more activity states of the device and/or to detect indications that the user is not viewing or does not wish to view the video portion of the multimedia content. The sensors 360 may be coupled to a sense circuit 328 coupled for processing the various signals and conditions detected by the sensors 360. The sensors 360 may include, for example, a front-facing camera 364 that is configured to use facial recognition techniques to determine whether a user is viewing a screen on the mobile device, and/or a gyroscope 366 configured to determine movement or lack of movement corresponding to the user putting the mobile device down. As another example (not shown), a Micro-Electro-Mechanical System (MEMS), for use in a smart phone or the like, includes detectors and circuitry to sense orientation, movement and direction.

The sensors may also or alternatively include a proximity sensor 362 configured to determine whether the mobile device is face down or closed (e.g., if the mobile device is a clam-shell device). Proximity sensors may include various forms such as electromagnetic sensors, inductive proximity sensors, or light sensors (e.g., photosensors). For example, a proximity sensor 362 in the form of a front-facing light sensor on a mobile device 31 may be able to determine an amount of light reaching the light sensor from in front of the mobile device 31. If there is no light or if the light reaching the sensor is below a threshold amount, the processor 312 may determine that the mobile device is face down or closed and, therefore, the user is not viewing the video portion of the multimedia content. Other types of proximity sensors may be similarly used. For example, a front-facing proximity sensor may use a beam of electromagnetic radiation to determine the distance an object is from the front of the mobile device. If the distance is less than a threshold distance (e.g., 1 inch), the processor 312 may determine that the mobile device is face down, closed, or being held up to the side of the user's face (e.g., for receiving a phone call) and, therefore, the user is not viewing the video portion of the multimedia content.

The sensors may also or alternatively include a heat sensor 368 configured to detect whether the user has the mobile device 31 held up against the user's face or in front of the user's face. Heat sensors 368 using various technologies (e.g., infrared thermometers) may be used to detect heat or determine the temperature of the area in front of the mobile device 31. Based on whether the heat in front of the mobile device 31 is different from the ambient temperature or near the body temperature of a human being, for example, the processor 312 may determine whether the mobile device is being held up against the user's face or in front of the user's face.

Sensors may also be implemented, at least in part, in software as part of an operating system or application stored on a machine-readable medium and executed by the processor 312. Such sensors, such as software sensor 350 may configure the processor 312 to determine whether an active window (or other user interface element) displayed on the mobile device's screen is the window playing the multimedia content or another window. The active window for the mobile device may be changed or chosen based on user input (e.g., a user selection via the keys 330, the touch screen display 320, or another input device) or based on an event (e.g., a new window popping up). Other sensors 360 may determine, for example, whether the window playing the multimedia content is minimized, whether the mobile device has entered a locked mode, whether the mobile device's screen is on or has been turned off.

The device's screen may be turned off for several reasons. For example, in some cases, power saving settings on a mobile device may be configured to automatically shut off the display, such as the touch screen display 320, in response to having no user interaction or user input for a predetermined period of time. Shutting down of the display may reduce battery consumption by at least some amount, especially in mobile devices with larger displays. In other cases, an operating system process may automatically enter a locked state after a period of time and, in doing so, shut off the mobile device display.

There are some scenarios in which a user does not view or does not wish to view the video portion of the multimedia content. However, the streaming of the multimedia content should not be stopped entirely because the user may still wish to listen to the audio portion of the multimedia content. For example, the multimedia content may be a video (and associated audio) of a speech, a lecture, or a music video and the user is more interested in the associated audio portion of the multimedia content than the video portion. In other scenarios, the user may be attempting to multitask and view other items of interest while listening to the audio portion of the multimedia content. For whatever reason, it may be desirable to stop streaming the video portion of the multimedia content while continuing with the audio portion and doing so may reduce the amount of data consumed by the user.

Accordingly, if one or more of the sensors 360 or 350 detects a condition that corresponds to a predetermined activity state indicating that the user is not viewing or does not wish to view the video portion of the multimedia content, the mobile device 31 may transmit a communication (e.g., a status report) to a server that causes the video portion of the multimedia content to stop being transmitted to the mobile device while the audio portion of the multimedia content continues to be transmitted to the mobile device. Similarly, if one or more of the sensors 360 or 350 later detects a condition that corresponds to a state indicating user operation the mobile device in a manner to observe video output, the mobile device 31 may transmit a communication (e.g., a status report) to the server that causes the server to resume streaming of video portion of the multimedia content through the network to the mobile device.

The structure and operation of the mobile device 31, as outlined with respect to FIG. 3, were described by way of example, only.

Figure 4:
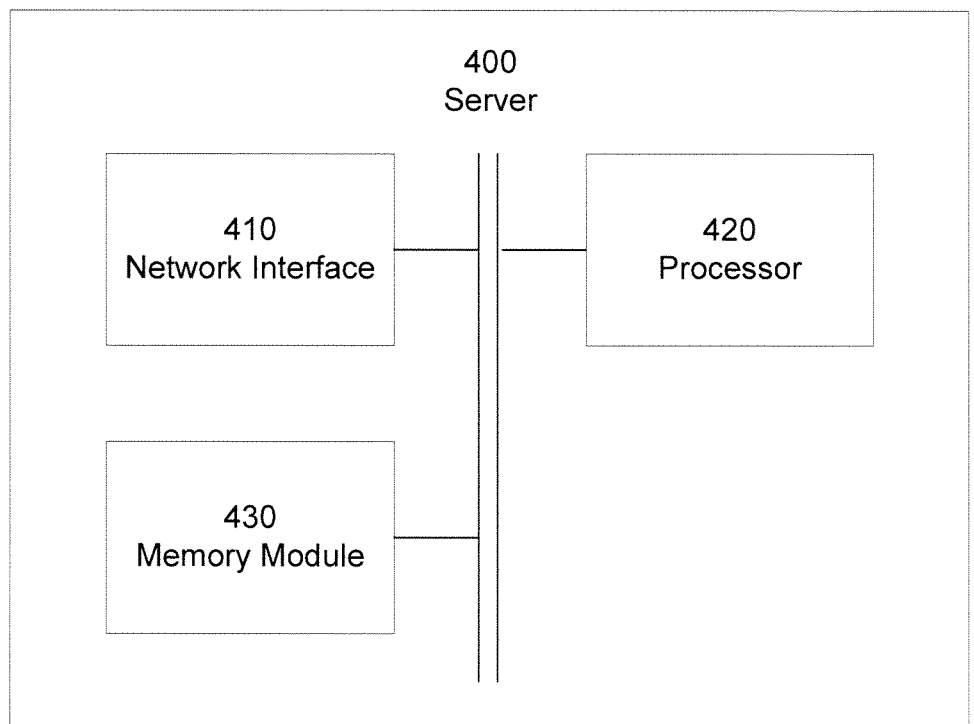
FIG. 4 is a block diagram illustrating an exemplary server configured to provide intelligent streaming of multimedia content to a device.

FIG. 4 is a block diagram illustrating an example of a server 400 configured to provide intelligent streaming of multimedia content to a device. The server 400 may be, for example, the multimedia server 41, the gateway server 107, or another server in the mobile communication network 21, in the communication network 35, or in another location in the network environment 10 of FIG. 1. Furthermore, the server 400 may be associated with a third party provider of multimedia content or associated with the carrier or service provider that operates the mobile communication network 21. The server 400 in FIG. 4 is shown as having a network interface 410, a processor 420, and a memory module 430. In other examples, however, the server 400 may include additional components, fewer components, or different components. For example, in some implementations, the server may have or connect to storage devices for the actual multimedia contents, whereas in other examples, the server may have network communications with the servers or other equipment that store and send requested multimedia contents.

The network interface 410 is configured to enable the server 400 communicate with other systems, servers, or devices (such as mobile device 31) over a data communication network. For example, the network interface 410 may be used to retrieve multimedia content from the multimedia server 41, a content provider, or other sources. The network interface 410 may also communicate with a mobile device 31 in order to set up data stream and stream the multimedia content to the mobile device 31.

The processor 420 serves as a programmable controller for server 400 by configuring server 400 to perform various operations, for example, in accordance with instructions or programming executable by processor 420. Such operations may include, for example, various general operations of server 400 as well as operations implemented by execution of various applications that have been installed on the server 400 and directing other components of the server such as network interface 410 and memory module 430. The server operations implemented by processor execution of appropriate programming may also include operations related to streaming multimedia content and related operations as described herein.

The memory module 430 may include one or more memory devices such as a hard disk drive, a flash memory, or other storage devices. The memory module 430 may be configured to store, for example, programming or instructions such as the server operating system and application software configured for execution on the processor 420 via or in cooperation with the specific operating system. The application software may include programming that enables the server 400 to stream multimedia to a mobile device 31, as described herein. The software aspects of the technology may be thought of as "products" or "articles of manufacture" typically in the form of executable code or process instructions and/or associated data that is stored on or embodied in a type of machine or processor readable medium.

The execution of the application software by the processor 420 enables the server 400 to retrieve multimedia content via the network interface 410 from other sources as described above and store the multimedia content on the memory module 430. In some cases, the application software may also configure the processor 420 to process the multimedia content and generate different versions of the multimedia content which may also be stored on the memory module 430. For example, the processor 420 may extract audio content from multimedia content that includes both video content and associated audio content and store the extracted audio content in a new version of the multimedia content. On the other hand, the processor 420 may make a copy of the multimedia content that includes a video portion and an audio portion and remove the video content.

Software stored on the memory module 430 may also configure the processor 420 to communicate with a mobile device 31 via the network interface 410 in order to set up streaming of multimedia content through a wireless mobile data communication network and begin the stream, via the network interface 410. The multimedia content initially streamed to the mobile device 31 may include a video portion and an associated audio portion, whereas at another time, the streamed content may include audio only (no video portion).

More specifically, during the streaming process, the network interface 410 may receive a status report from the mobile device 31. The status report may include information that may be used by the processor 420 executing software to determine whether to change the stream to the mobile device 31. As will be discussed further with respect to FIG. 5-FIG. 7, the status report may include a request for a particular version of the multimedia content, an activity state of the mobile device 31, or information that the processor 420 executing software to determine the activity state of the mobile device 31. Responsive to an activity state of the mobile device 31 indicating user operation of the mobile device in a manner to observe audio output but not video output, the processor 420 executing the software may stop streaming of the video portion of the multimedia content through the wireless mobile data communication network and continue streaming of the audio content, as discussed herein.

The structure and operation of the server 400, as outlined with respect to FIG. 4, were described by way of example, only.

Figure 5:
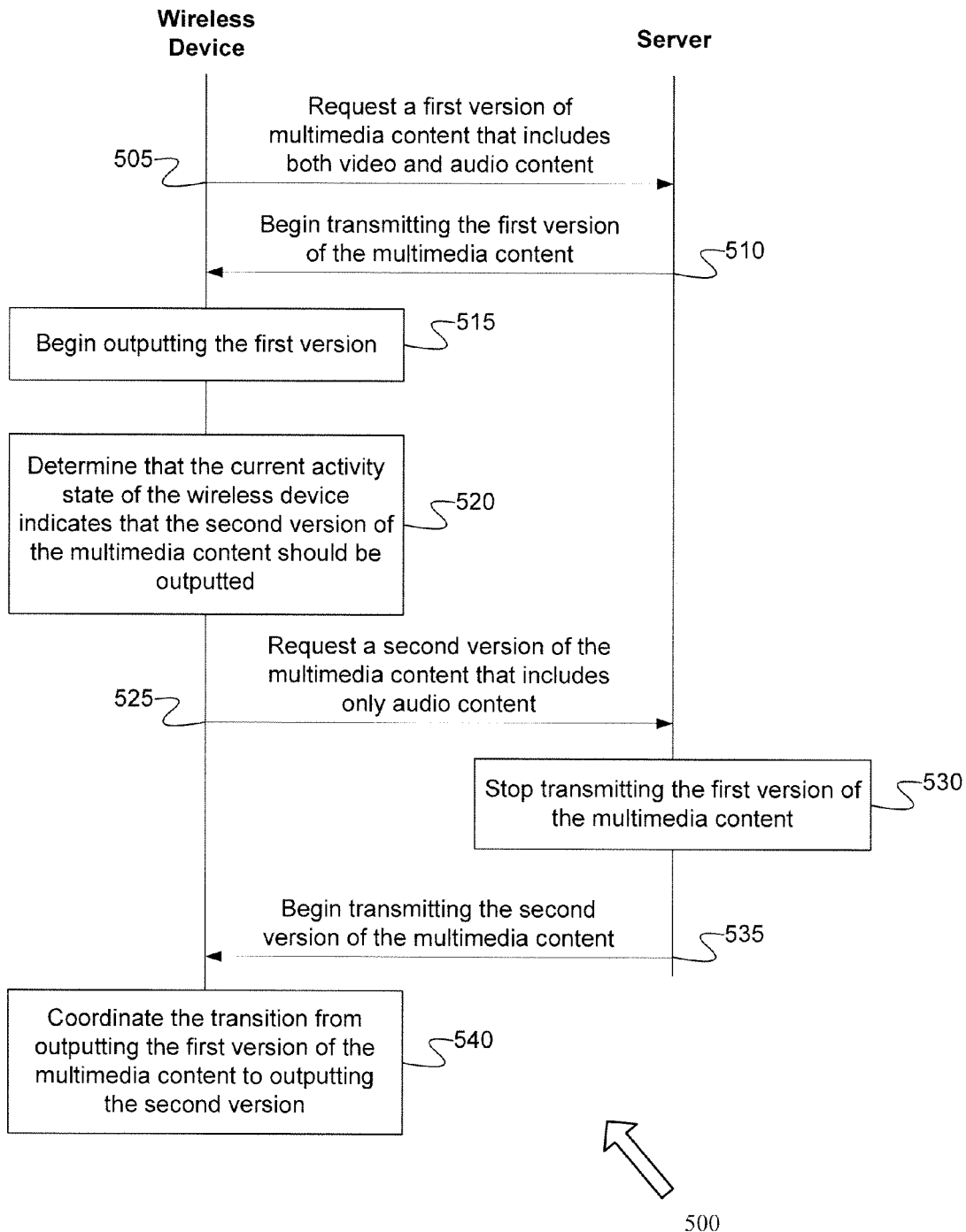
FIG. 5 is a flow diagram illustrating an example of one intelligent streaming process.

FIG. 5 is a flow diagram illustrating an example of one intelligent streaming process 500. Although FIG. 5 shows a number of operations, other examples may include additional operations, fewer operations, or substitute operations. In the example of FIG. 5, the server 400 may make two corresponding versions of the multimedia content available to the mobile device 31. The first version may contain both the video content and the associated audio content while the second version may contain only the audio content. The server 400 may, for example, provide a defined application programming interface (API) function call that enables the mobile device 31, via the digital transceiver 308, to transmit a request for the first version of the multimedia content or the second version of the multimedia content to the server 400. Alternatively, the server 400 may allow the microprocessor 312, executing the multimedia streaming program 346 on the mobile device 31, to select the appropriate version of the multimedia content based on the determined activity state of the mobile device 31. The mobile device's digital transceiver 308 may then retrieve the selected version from the server via the wireless communication network, using uniform resource locators (URLs).

Referring back to FIG. 5, initially (at 505), the digital transceiver 308 of the mobile device 31 may transmit a request for the first version of the multimedia content to the network interface 410 of the server 400. The first version may include both the video portion and the associated audio portion. In response to receiving the request, the network interface 410 of the server 400 may begin transmitting the first version to the mobile device at 510. At 515, the mobile device 31 may begin providing the first version of the multimedia content through the touch screen display 320 and speaker 304 as the multimedia content is being received from the server 400.

At some point while the first version is being transmitted to the mobile device 31, at 520, the microprocessor 312, which is executing the multimedia streaming program 346 on the mobile device 31, may determine that the current activity state of the mobile device 31 is indicative of the desirability of the second version of the multimedia content being transmitted to the mobile device 31. The second version of the multimedia content includes the same audio content as the first version of the multimedia content but does not include the video content of the first version of the multimedia content. As described above, the current activity state of the mobile device may be determined by the microprocessor 312 executing the multimedia streaming program 346 based on one or more factors or signals detected by sensors 360 and/or 350 on the mobile device 31. Based on the determination, the digital transceiver 308 may transmit a request for the second version of the multimedia content at 525. The request may be in the form of an API function call to request the second version of the multimedia content or a request that includes the URL for the second version. The network interface 410 of the server 400 receives the request and, in response to receiving the request, may stop transmitting the first version of the multimedia content to the mobile device at 530 and begin transmitting the second version at 535.

In some cases, the determining of the current activity state of the mobile device 31 may occur independently of the streaming of the multimedia content. For example, the microprocessor 312, executing the multimedia streaming program 346 on the mobile device 31, may intermittently determine the current activity state of the mobile device or determine the current activity state in response to another event unrelated to the streaming of the multimedia content. For example, the microprocessor 312 may determine the activity state on a schedule (e.g., every 10 seconds). Furthermore, the schedule may vary based on factors such as the length of the multimedia content. For example, the microprocessor 312 may determine the activity state for the mobile device 31 more frequently when playing multimedia content of shorter length and less frequently when playing multimedia content of longer length. In other examples, the microprocessor 312 may determine the activity state in response to the sensors 360 and/or 350 detecting certain conditions or signals such as if the active window is no longer the window displaying the video portion of the multimedia content. The sensors may also be configured to perform detection functions on a schedule or in response to conditions or signals detected by other sensors. For example, a sensor may detect the presence or absence of a condition more frequently when playing multimedia content of shorter length and less frequently when playing multimedia content of longer length. Alternatively the sensor may detect the presence or absence of a condition in response to another sensor detecting a condition. For example, one sensor may detect whether the display screen of the mobile device 31 is face down or closed in response to another sensor detecting that the mobile device 31 has been resting in place for a predetermined period of time.

Referring back to FIG. 5, once the stream for the second version of the multimedia content begins to be received by the mobile device 31, the microprocessor 312, executing the multimedia streaming program 346 on the mobile device 31, may, at 540, coordinate the transition from providing the first version of the multimedia content to the touch-screen display 320 (video) and the speaker 304 (audio) to providing the second version to the speaker 304 only. The transition from the first version of the multimedia content to the second version of the multimedia content may be made such that the playing of the multimedia content is not halted or restarted. For example, the microprocessor 312 executing the multimedia streaming program 346 may determine a time value, frame number, or other measure of the progress made in providing the first version of the multimedia content, identify a multimedia location in the second version of the multimedia content that corresponds to the progress made in the first version, stop providing of the first version, and begin the providing of the second version at the multimedia location that corresponds to the progress made in providing the first version.

While the second version of the multimedia content is being provided to the speaker 304, the microprocessor 312 of the mobile device 31 may continue to monitor the sensors 350 and 360 and the activity state. If the current activity state of the mobile device 31 indicative of the desirability of the first version of the multimedia content being transmitted to the mobile device 31 from the server and being provided by the mobile device 31, the microprocessor 312 may perform additional operations to transition from providing the second version of the multimedia content to the first version of the multimedia content.

Figure 6:
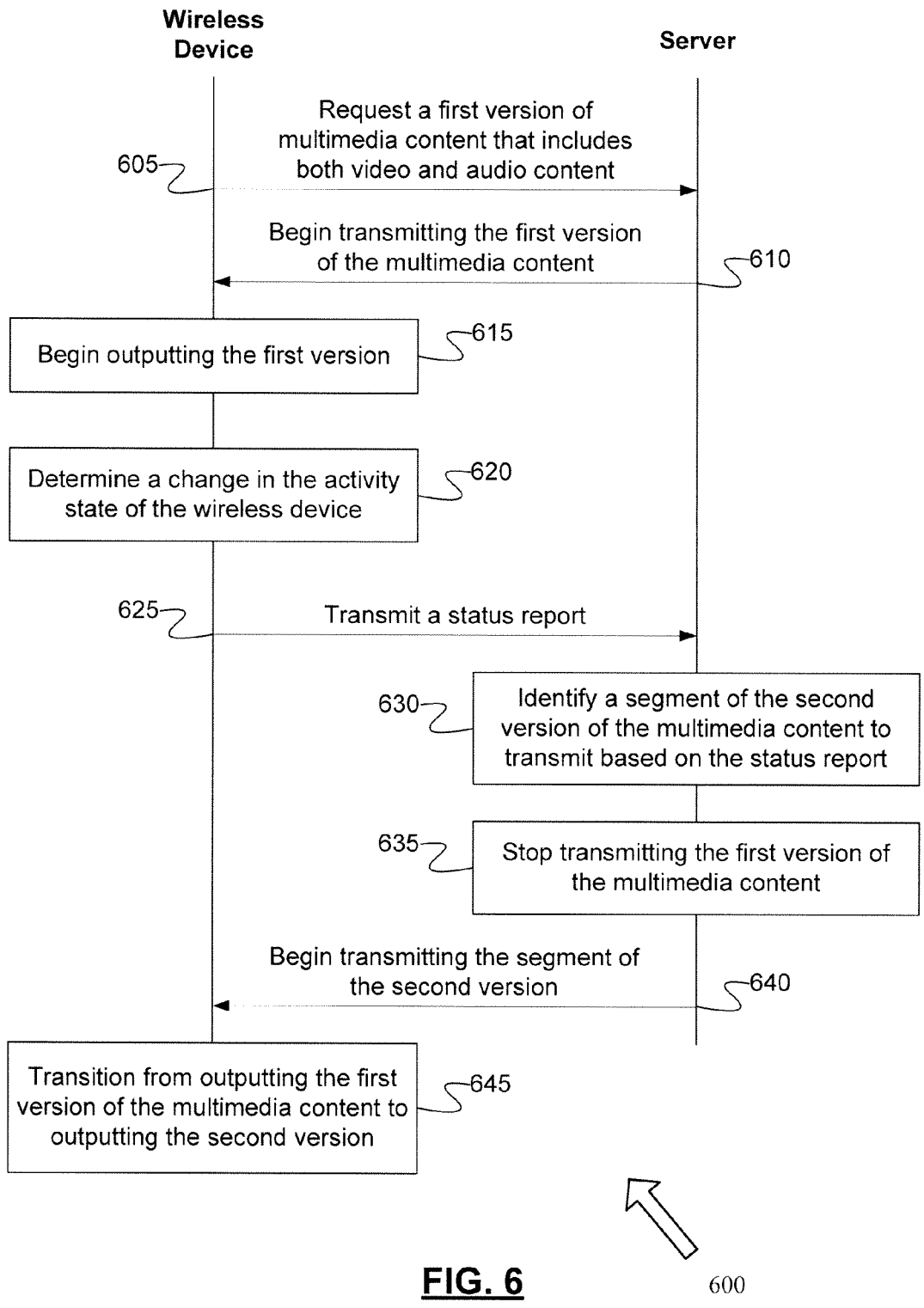
FIG. 6 is a flow diagram illustrating an example of another intelligent streaming process.

In other examples, the server 400 may help the mobile device transition from providing one version of the multimedia content to providing another, different version. For example, FIG. 6 is a flow diagram illustrating an example of another intelligent streaming process 600. Although FIG. 6 shows a number of operations, other examples may include additional operations, fewer operations, or substitute operations.

In the example of FIG. 6, the memory module 430 of the server 400 stores or has access to at least two versions of the multimedia content available to the mobile device 31. For example, the two versions may be stored on the memory module 430 of the server 400 or stored on another system. The first version may contain both the video content and the associated audio content while the second version may contain only the audio content. In another example, the network interface 410 may directed by the processor 420 to retrieve the first version that contains video content and the associated audio content. The processor 420, executing software stored on the memory module 430, may generate a second version of the multimedia content by extracting the associated audio content (or removing the video content) from the first version of the multimedia content. Both versions of the multimedia content may be stored on the memory module 430. Alternately, the server 400 may have access to (and store) an audio-only version of the multimedia content without generating the audio-only version from a version that contains both audio and video. If the server 400 is a gateway server or the like that receives the multimedia content from another server or the like, the server 400 may receive both portions but extract and send only the audio portion through the mobile network to the mobile device based on the appropriate communication regarding activity state from the mobile device.

At 605, the mobile device 31 may request, via the digital transceiver 308, the first version of the multimedia content that includes both the video portion and the associated audio portion. The first version may be explicitly identified in a request transmitted to the server 400 or understood by the server 400 to be the default or initial version of the multimedia content. In response to receiving the request, network interface 410 of the server 400 may begin transmitting the first version to the digital transceiver 308 of mobile device 31 at 610. At 615, the mobile device 31 may begin streaming the first version of the multimedia content as it is being received from the server 400 using, for example, the touch-screen display 320 and the speaker 304.

While the first version is being transmitted to the mobile device 31, at 620, the microprocessor 312, executing the multimedia streaming program 346 on the mobile device 31, may determine whether there has been a change in the current activity state of the mobile device. The current activity state may include information such as an indication that another version of the multimedia content should be transmitted to the mobile device 31, an indication that the user is no longer viewing the video portion of the multimedia content, an indication that the user does not wish to view the video portion of the multimedia content, a progress indicator representing the how much of the multimedia content has been provided by the mobile device 31 (e.g., a time elapsed, a frame in the multimedia content, etc.), and/or one or more of the signals or conditions detected by the mobile device's sensors 360 or 350.

As described above, the sensors 360 may be configured to detect, for example, whether the touch-screen display 320 of the mobile device 31 is face down, closed (as in the case of a clam-shell type mobile device or laptop), or otherwise oriented such that no viewing of the video content on the display 320 may occur, whether a user's face or eyes are located in an area capable of viewing the video content or the display 320, whether the user has the mobile device 31 held up against the user's face or in front of the user's face, or whether the user has put the mobile device 31 down. The sensors 350 may also be configured to detect whether an active user interface element (e.g., a window (or other user interface element) on the display 320 is showing the multimedia content, whether the user interface element displaying the multimedia content is minimized, whether the mobile device 31 is in a locked or power saving state, or whether the mobile device's display 320 is on or has been turned off.

In one variation, if the microprocessor 312, executing the multimedia streaming program 346 on the mobile device 31, detects that a change in the activity state of the mobile device has occurred, the microprocessor 312 may determine whether the second version of the multimedia content (e.g., the version with the associated audio content only) should be provided to the mobile device 31. If the second version should be provided, at 625, the microprocessor 312 may direct the digital transceiver 308 to transmit a status report to the server 400. The status report may include a request for the second version of the multimedia content, and a progress indicator (e.g., a time stamp or frame number) regarding the providing of the multimedia content on the mobile device 31.

Once the status report is received by network interface 410 of the server 400, the processor 420, executing software stored on the memory module 430, may retrieve the second version of the multimedia content and, at 630, identify a segment of the second version that corresponds to the current progress of the mobile device 31 in providing of the multimedia content. For example, the processor 420 may select the segment of the second version based on the time stamp or frame number in the progress indicator plus an additional amount of time or number of frames that accounts for the delay from transmitting the status report to receiving the second version of the multimedia content. The additional amount of time or number of frames may be a predefined value or calculated dynamically based on factors such as processor load, bandwidth congestion, or other factors affecting the timing of communications and processing.

According to another variation, however, the status report may not include a progress indicator. Instead, the processor 420 may determine the progress of providing the multimedia content to the mobile device 31 based on the progress made in transmitting the first version of the multimedia content to the mobile device 31. The processor 420 may then identify the segment of the second version based on the progress made in transmitting the first version of the multimedia content to the mobile device 31. For example, the processor 420 may determine that the portion of the first version of the multimedia content corresponds to a particular time stamp or frame number. The processor 420 may then identify a segment of the second version that begins at the particular time stamp or frame number. At 635, the network interface 410 of the server 400 can stop transmitting the first version to the mobile device 31 and, at 640, begin transmitting the segment of the second version to the mobile device 31.

In another variation, if the microprocessor 312 on the mobile device 31 detects that a change in the activity state of the mobile device 31 has occurred, the mobile device's digital transceiver 308 may transmit the status report to the server 400. The status report may include information regarding the current progress of the providing of the multimedia content on the mobile device, the current activity state of the mobile device 31, or any signals or conditions detected by the mobile device's sensors 360 or 350 that may indicate that the user is no longer viewing or does not wish to view the video portion of the multimedia content. Once the status report is received at the server 400, the server's processor 420 may determine whether or not to switch from transmitting the first version of the multimedia content to transmitting the second version based on the signals or conditions in the status report received from the mobile device 31. If the processor 420 determines that a switch is needed, at 630, the processor 420 may identify the segment of the second version that corresponds to the current progress of the mobile device 31 in providing of the multimedia content and, at 635, direct the network interface 410 to stop transmitting the first version of the multimedia content to the mobile device 31 and begin transmitting the segment of the second version to the mobile device 31.

Once the second version of the multimedia content begins to be received by the mobile device's digital transceiver 308, at 645, the microprocessor 312 executing the multimedia streaming program 346 may transition the mobile device 31 from providing the first version of the multimedia content to the touch-screen display 320 (video) and the speaker 304 (audio) to providing the second version to the speaker 304 only. Furthermore, as the second version of the multimedia content is being provided, the microprocessor 312 may continue monitoring the activity state of the mobile device 31 and direct the digital transceiver to transmit the status report to the server 400 such that the streaming of the multimedia content may transition back to the first version if necessary.

Figure 7:
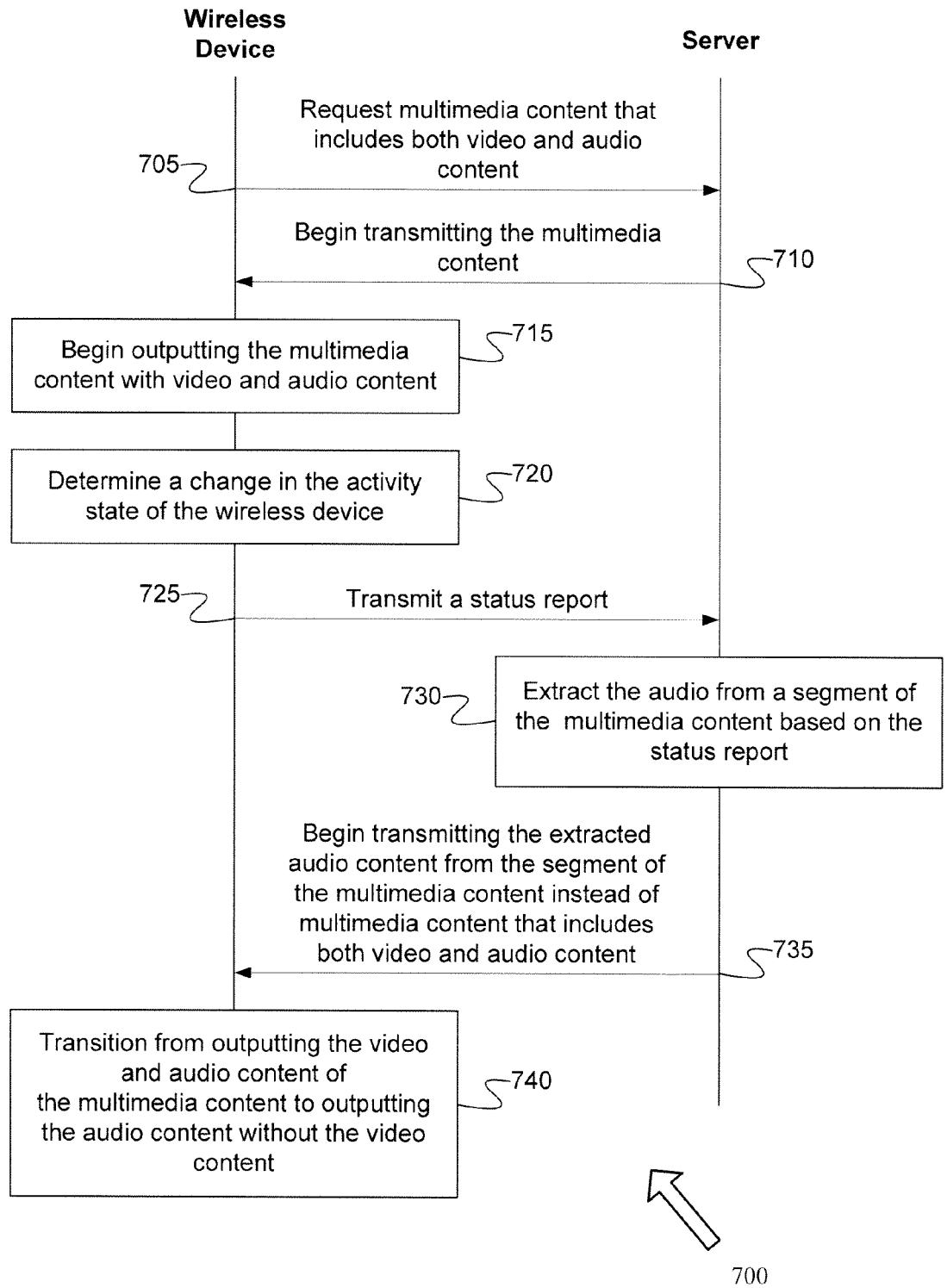
FIG. 7 is a flow diagram illustrating an example of another intelligent streaming process.

FIG. 7 is a flow diagram illustrating an example of another intelligent streaming process 700. Although FIG. 7 shows a number of operations, other examples may include additional operations, fewer operations, or substitute operations. In the example of FIG. 7, the memory module 430 of the server 400 may initially only have access to one version of the multimedia content that includes a video portion as well as the associated audio portion. In order to provide intelligent streaming of the multimedia content, processor 420 is configured to extract the associated audio portion from the multimedia content when called upon and direct the network interface 410 to transmit the audio portion of the multimedia content to the mobile device 31 and without the video portion.

At 705, the digital transceiver 308 of the mobile device 31 may transmit a request for the unmodified multimedia content that includes both the video portion and the associated audio portion. The network interface 410 may receive the request and, at 710, processor 420 may direct the network interface 410 to begin transmitting the multimedia content to the mobile device. Once the multimedia content begins to be received by the digital transceiver 308 at the mobile device 31, at 715, the touch-screen display 320 and the speaker 304 may begin providing the video portion as well as the associated audio portion of the multimedia content, as it is being received from the server 400.

At 720, as discussed with respect to previous examples, the microprocessor 312, executing the multimedia streaming program 346 on the mobile device 31, may determine whether there has been a change in the current activity state of the mobile device. If the microprocessor 312 detects that a change in the activity state of the mobile device has occurred, the microprocessor 312 may direct the digital transceiver 308 to transmit the status report to the server 400 at 725.

Based on the status report received from the mobile device 31 by the server's network interface 410, the processor 420, executing software stored on the memory module 430, may determine whether a version of the multimedia content that does not include the video content is requested by or should be provided to the mobile device 31. If a version of the multimedia content that does not include the video content is called for, the processor 420 may extract the audio content from the multimedia content at 730. The network interface 410 may then stop transmitting the version of the multimedia content that includes the video and begin transmitting the extracted audio content to the mobile device at 735. In another variation, the processor 420 may remove the video portion of the multimedia content instead of extracting the audio portion and the multimedia content without the video portion may be transmitted to the mobile device 31. The new version of the multimedia content may also be stored on the memory module 430 for later use, in some cases.

Once the second version of the multimedia content begins to be received by the digital transceiver 308 of the mobile device 31, the microprocessor 312 may transition the mobile device 31 from providing the both the audio and video portions of the multimedia content to providing the multimedia content without the video portion at 740. The microprocessor 312 may continue monitoring the activity state of the mobile device 31 and direct the digital transceiver to transmit the status report to the server 400 such that the streaming of the multimedia content may transition back to providing both the video portion and the associated audio portion of the multimedia content if necessary.

Although FIG. 5 to FIG. 7 illustrate different examples, aspects of each example may also apply to different examples. Furthermore, the steps described in those examples may occur in different orders or in parallel in some cases as the operations as outlined with respect to FIG. 5 to FIG. 7, were described by way of example, only.

In some cases, the processor 420 may store an indication (e.g., a time stamp or frame number) of the progress made in transmitting the first version of the multimedia content that includes the video content and the associated audio content in the memory module 430. The indication stored in the memory module 430 may be used to resume providing the first version of the multimedia content at the location where the first version was last stopped. For example, as described above, the processor 420 may, either automatically or in response to user input, stop transmitting the first version of the multimedia content to the mobile device 31 and begin transmitting the second version of the multimedia content. The mobile device 31 will in turn stop providing the first version of the multimedia content and begin providing the second version.

In certain situations, at some time after the first version of the multimedia content is stopped streaming, the user may wish to resume experiencing the first version of the multimedia content. For example, the user listening to the audio portion of the multimedia content without viewing the video portion may realize that viewing the video portion is desirable. The microprocessor 312, executing the multimedia streaming program 346 on the mobile device 31, may direct the touch screen display 320 to present a user interface element that enables the user to select the option of resuming the streaming of the first version of the multimedia content including the video content and the associated audio content from the place where the first version was stopped. Based on a user selection of the option, the mobile device 31 may transmit a request to provide the first version of the multimedia content from the place where the first version was stopped. Upon receiving the request via the network interface 410, the server processor 420 may determine a location in the first version of the multimedia content based on the indication of progress stored in the memory module 430 and begin transmitting the first version of the multimedia content to the mobile device 31 from that location.

According to some examples, the mobile device 31 may also be configured to receive user input and intelligently stream multimedia content based on the user input. In one example, the microprocessor 312, executing the multimedia streaming program 346 on the mobile device 31, may direct the touch screen display 320 to present a user interface element that allows a user of the mobile device 31 to enable intelligent streaming of multimedia content. If the user, through the touch screen display 320, enables intelligent streaming, the microprocessor 312 may direct the sensors 360 or 350 to begin monitoring conditions and signals that may indicate that the video portion of the multimedia content should not be streamed.

In another example, when certain conditions or signals are detected by the sensors 360 or 350, the microprocessor 312, executing the multimedia streaming program 346 on the mobile device 31, may direct the touch screen display 320 to present a user interface element that notifies a user of the mobile device 31 of different functionalities and allows the user to select a desired functionality. For example, the user interface element may allow the user to select the option to receive an audio only version of the multimedia content or to terminate the streaming of the multimedia content (with later restoration of the stream possible). In some aspects, the user interface element may be presented to the user depending on what condition or signal is detected by the sensors 360 or 350. For example, if the touch screen display 320 or another display has been shut down, the user interface element may not be presented to the user. On the other hand, if the user has changed active windows from the window in which the multimedia content is being displayed to another window, the microprocessor 312 may cause the user interface element to be displayed on the touch screen display 320.

In another example, before a status report is sent to the server 400, the microprocessor 312, executing the multimedia streaming program 346 on the mobile device 31, may direct the touch screen display 320 to present a user interface element that notifies the user of the status report and requests instructions to send the status report to the server 400. The status report may then be sent to the server if it is instructed by the user, through the touch screen display 320.

In still another example, before the stream is switched from one version of multimedia content to another version of the multimedia content, the microprocessor 312 may direct the touch screen display 320 to present a user interface element that requests authorization from the user to switch to the other version. Only if the user, through the touch screen display 320, authorizes the switch will the mobile device 31 work with the server, as described above, to transition from providing one version of the multimedia content to the other version.

Although the examples illustrated in FIG. 5 to FIG. 7 have the first version of the multimedia content containing the video portion and the associated audio portion and the second version containing only the audio portion, in other examples, the initial version of the multimedia content delivered to the mobile device 31 may be the version of the multimedia content containing only the audio portion and not the video portion. For example, before beginning a streaming session, the microprocessor 312 of the mobile device 31, executing the multimedia streaming program 346, may determine that the current activity state of the mobile device 31 indicative of the desirability of the version of the multimedia content containing the audio content without the video content being transmitted from the server to the mobile device 31. Accordingly, the digital transceiver 308 may transmit a request for the version of the multimedia content containing the audio content without the video content such that the mobile device 31 may begin the streaming session providing the version of the multimedia content containing only the audio portion via the speaker 304. If the activity state of the mobile device changes to indicate that the video content should be received, the version of the multimedia content containing the video portion as well as the audio portion may be transmitted to the mobile device 31 and provided.

Figure 8:
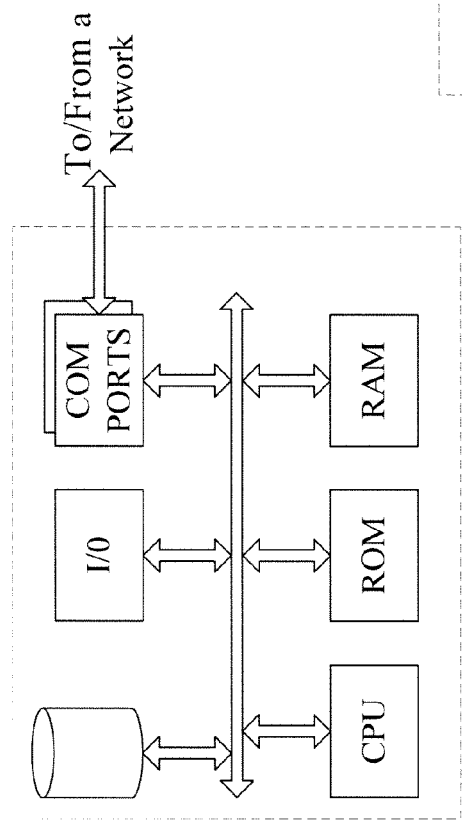
FIG. 8 is a block diagram illustrating a network or host computer.
Figure 9:
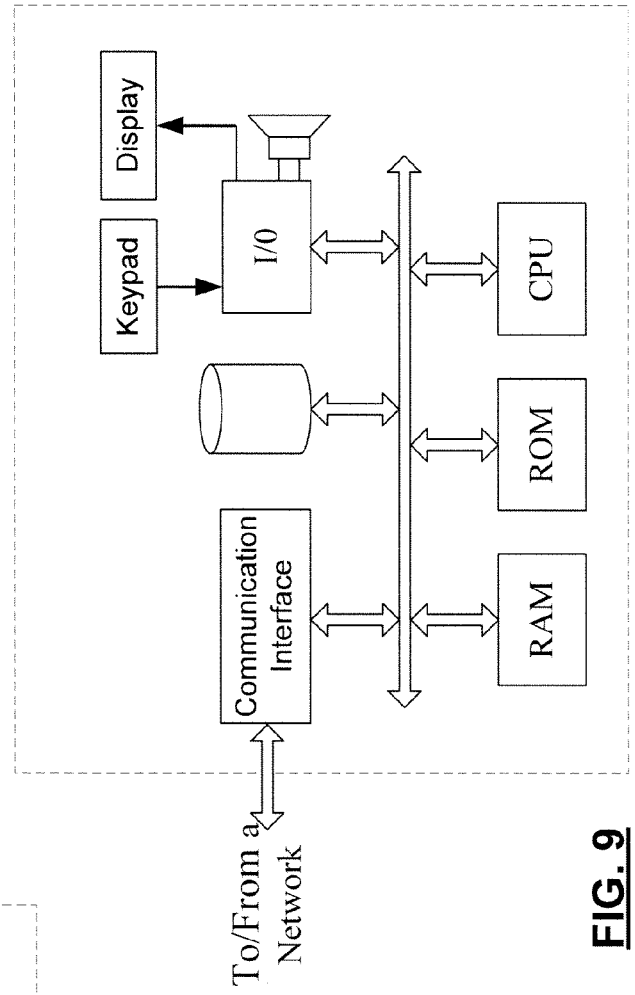
FIG. 9 is a block diagram illustrating a computer with user interface elements.

FIGS. 8 and 9 provide functional illustrations of general purpose computer hardware platforms. FIG. 8 is a block diagram illustrating a network or host computer, as may typically be used to implement a server. FIG. 9 is a block diagram illustrating a computer with user interface elements. In particular, FIG. 9 depicts a device with user interface elements, as may be used to implement a computer, a mobile device, or any other computing device. FIG. 9 can also be used to implement a mobile device, such as a portable handset, a smart-phone, tablet computer, a personal digital assistant or other type of mobile station or mobile terminal device (e.g., devices 13*a* to 13*d* of FIG. 1). A device like that of FIG. 9 may also act as a server if appropriately programmed. It is believed that the general structure and general operation of such equipment as shown in FIGS. 8 and 9 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, one or more such computer hardware platforms would run server programming, for example, to provide multimedia content (e.g., server 41), function as a gateway (e.g. server 107), etc., for streaming compunction through a network to a mobile device (e.g., 13a to 13d) as illustrated in FIG. 1.

The server software functionalities involve programming, including executable code and possibly associated stored multimedia content data. The software code is executable by the central processing unit or other processor of the computer configured as the particular server. In operation, the code is stored within the server computer device. At other times, however, the software may be stored at other locations and/or transported for loading into the appropriate server computer or system. Execution of such code by a processor of the server computer enables the server to perform functions of receiving requests or messages from a mobile device and streaming multimedia content to the mobile device through the mobile traffic network, in essentially the manner performed in the implementations discussed and illustrated herein.

A user terminal such as a general-purpose personal computer or a mobile device typically comprises a central processor or other processing device, an internal communication bus, various types of memory or storage multimedia (RAM, ROM, EEPROM, cache memory, disk or flash drives for mass storage, etc.) for code and data storage, and one or more network or communication interfaces or ports for communication purposes. The software functionalities involve programming, including executable code as well as associated stored data, e.g. files used for applications on the mobile device to process the instructions and/or multimedia content received from the network. The software code is executable by the mobile device. In operation, the code is stored within the mobile device. At other times, however, the software may be stored at other locations and/or transported for loading into the appropriate mobile device system. Execution of such code by a processor of the mobile device enables the mobile device to perform functions of receiving content from a multimedia server through the mobile traffic network, in essentially the manner performed in the implementations discussed and illustrated herein.

Hence, aspects of the methods of stopping and/or restarting the transmission of the video portion of multimedia content being streamed when a user's activity (or lack thereof) on a mobile device indicates that the user is not viewing the video may be implemented in appropriate programming for the mobile device and/or the appropriate network connected server. In some cases, only the audio portion of multimedia content is streamed. Program aspects of the technology may be thought of as "products" or "articles of manufacture" typically in the form of executable code and/or associated data that is carried on or embodied in a type of non-transitory machine readable medium or in other media.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising steps of:
receiving, from a mobile device and by a gateway server of a wireless mobile data communication network, a request for a first version of multimedia content comprising video content and associated audio content, the gateway server configured to determine data usage through the wireless mobile data communication network for an account associated with the mobile device;
streaming, by the gateway server and responsive to receipt of the request, the first version of multimedia content comprising video content and associated audio content through the wireless mobile data communication network for receipt by the mobile device, the streaming of the first version of the multimedia content generating a first amount of data usage determined by the gateway server;

receiving, from the mobile device and by the gateway server, a status report comprising a progress indicator identifying a multimedia location of the first version of the multimedia content already provided to a user of the mobile device, the status report indicative of a predetermined activity state based at least in part on a sensor of the mobile device indicating that the multimedia content should be provided without video output; and responsive to receipt of the status report and in accordance with the progress indicator, replacing, by the gateway server, the streaming of the first version of the multimedia content comprising video content and associated audio content through the wireless mobile data communication network with streaming of a second version of the multimedia content comprising the associated audio content without the video content through the wireless mobile data communication network for receipt by the mobile device, the streaming of the second version of the multimedia content generating a second amount of data usage determined by the gateway server.

2. The method of claim 1, further comprising steps of:
receiving, from the mobile device and by the gateway server, a subsequent status report indicative of a change from the predetermined activity state to another activity state of the mobile device indicating operation of the mobile device that would allow viewing of video output; and responsive to the subsequent status report, replacing the streaming of the second version of the multimedia content comprising the associated audio content without the video content through the wireless mobile data communication network with the streaming of the first version of the multimedia content comprising video content and associated audio content through the wireless mobile data communication network for receipt by the mobile device.

3. The method of claim 1, wherein the progress indicator includes a time value corresponding to a segment of the multimedia content already outputted by the mobile device.

4. The method of claim 1, further comprising steps of:
identifying, by the gateway server, a segment of the audio content based on the progress indicator; and
transmitting, by the gateway server, the segment of the audio content through the wireless mobile data communication network to the mobile device.

5. The method of claim 1, further comprising steps of:
identifying, by the gateway server, a segment of the multimedia content comprising video content and associated audio content not yet outputted by the mobile device based on the progress indicator;
extracting, by the gateway server, audio content from the segment of the multimedia content; and
transmitting, by the gateway server, the extracted audio content through the wireless mobile data communication network to the mobile device.

6. The method of claim 1, wherein the status report further comprises the predetermined activity state of the mobile device.

7. The method of claim 1, wherein:
the status report further comprises sensor data for the mobile device, and
the method further comprises identifying, by the gateway server, the predetermined activity state based on the sensor data.

8. A system, comprising:
a wireless mobile data communication network configured to provide wireless mobile data communication to a mobile device; and
a gateway server computer coupled to the wireless mobile data communication network and configured to determine data usage for an account associated with the mobile device, the gateway server computer, comprising:
a network interface configured to enable the gateway server computer to stream multimedia content through the wireless mobile data communication network; and
a processor configured to control operations of the network interface such that the gateway server computer implements functions, including functions to:
receive, from the mobile device, a request for a first version of multimedia content comprising video content and associated audio content;
responsive to receipt of the request, stream the first version of multimedia content comprising video content and associated audio content through the wireless mobile data communication network for receipt by the mobile device;
receive, from the mobile device, a status report comprising a progress indicator identifying a multimedia location of the first version of the multimedia content already provided to a user of the mobile device, the status report indicative of a predetermined activity state based at least in part on a sensor of the mobile device indicating that the multimedia content should be provided without video output; and
responsive to receipt of the status report and in accordance with the progress indicator:
stop the streaming of the first version of the multimedia content comprising video content and associated audio content through the wireless mobile data communication network; and
stream a second version of the multimedia content comprising the associated audio content without the video content through the wireless mobile data communication network for receipt by the mobile device.

9. The system of claim 8, wherein the implemented functions further include functions to:
receive, from the mobile device, a subsequent status report indicative of a change from the predetermined activity state to another activity state of the mobile device indicating operation of the mobile device that would allow viewing of video output; and
responsive to receipt of the subsequent status report:
stop the streaming of the second version of the multimedia content comprising the associated audio content without the video content through the wireless mobile data communication network; and
stream the first version of the multimedia content comprising the video content and the associated audio content through the wireless mobile data communication network for receipt by the mobile device.

10. The system of claim 8, the gateway server computer further comprising:
a memory module configured to store the first version of the multimedia content comprising the video content and the associated audio content.

11. The system of claim 10, wherein the memory module is further configured to store the second version of the multimedia content comprising the associated audio content without the video content.

12. The system of claim 10, wherein the implemented functions further include a function to:
generate the second version of the multimedia content comprising the associated audio content without the video content by removing the video content from the first version of the multimedia content comprising the video content and the associated audio content.

13. The system of claim 8, wherein the implemented functions further include a function to:
retrieve the second version of the multimedia content comprising the associated audio content without the video content from a multimedia server.

14. A mobile device, comprising:
a wireless transceiver configured to enable data communication for the device through a wireless mobile data communication network;
at least one user interface element configured for user input and for audio and video output to the user;
a processor coupled to the transceiver and the at least one user interface element configured to control functions of the mobile device, including functions to:
receive a stream of a first version of multimedia content comprising video content and associated audio content through the wireless mobile data communication network from a gateway server of the wireless mobile data communication network;
output the received video content and associated audio content via the at least one user interface element;
detect a predetermined activity state based at least in part on a sensor of the mobile device indicating that the multimedia content should be provided without video output;
responsive to the detected predetermined activity state of the mobile device, send a status report to the gateway server through the wireless mobile data communication network to initiate a change to a stream of a second version of the multimedia content comprising the audio content but not the video content, the status report comprising a progress indicator identifying a multimedia location of the first version of the multimedia content already provided to a user of the mobile device; and
coordinate a transition from the stream of the first version of the multimedia content to the stream of the second version of the multimedia content based on the progress indicator.

15. The mobile device of claim 14, wherein: the functions include a function to receive the stream of the second version of the multimedia content;
the function to coordinate the transition includes a function to direct the at least one user interface element to output the audio content without the video content based on the multimedia location identified by the progress indicator; and
the functions further include functions to:
detect a change from the predetermined activity state to another activity state of the mobile device indicating operation of the mobile device that would allow viewing of video output;
responsive to the detection of the other activity state, operate the at least one user interface element to prompt the user of the mobile device to select whether video output is to be resumed from the multimedia location identified by the progress indicator;
upon the user selecting video output to be resumed from the multimedia location identified by the progress indicator, send a subsequent status report to the gateway server through the wireless mobile data communication network to resume the stream of the first version of the multimedia content based on the multimedia location identified by the progress indicator;
receive the resumed stream of the first version of the multimedia content based on the multimedia location identified by the progress indicator; and
direct the at least one user interface element to output the video content and associated audio content based on the multimedia location identified by the progress indicator.

16. The mobile device of claim 14, wherein:
the functions include a function to receive the stream of the second version of the multimedia content;
the function to coordinate the transition includes a function to direct the at least one user interface element to output the audio content without the video content based on the multimedia location identified by the progress indicator; and
the functions further include functions to:
detect a change from the predetermined activity state to another activity state of the mobile device indicating operation of the mobile device that would allow viewing of video output;
responsive to the detection of the other activity state, operate the at least one user interface element to prompt the user of the mobile device to select whether video output is to be resumed from the multimedia location identified by the progress indicator;
upon the user not selecting video output to be resumed from the multimedia location identified by the progress indicator, send a subsequent status report to the gateway server through the wireless mobile data communication network to resume the stream of the first version of the multimedia content based on a current multimedia location of the second version of the multimedia content already provided to the user;
receive the resumed stream of the first version of the multimedia content based on the current multimedia location of the second version of the multimedia content; and
coordinate a transition from the stream of the second version of the multimedia content to the resumed stream of the first version of the multimedia content based on the current multimedia location of the second version of the multimedia content.

17. The mobile device of claim 14, further comprising:
at least one sensor configured to identify at least one condition that indicates that the multimedia content should be provided without video output,
wherein the detection of the predetermined activity state of the mobile device is based on detection of the at least one identified condition.

18. The mobile device of claim 14, wherein:
the progress indicator is a time value corresponding to a segment of the multimedia content already outputted by the at least one user interface element.

19. The method of claim 1, further comprising a step of:
prior to streaming the first version of the multimedia content, establishing an evolved packet system bearer channel through the wireless mobile data communication network between the gateway server and the mobile device, the evolved packet system bearer channel being an IP packet flow with a defined quality of service, wherein the step of streaming the first version of the multimedia content is performed via the established evolved packet system bearer channel.

20. The system of claim 8, wherein the implemented function to stream the first version of the multimedia content further includes functions to:
establish an evolved packet system bearer channel through the wireless mobile data communication network between the gateway server computer and the mobile device, the evolved packet system bearer channel being an IP packet flow with a defined quality of service; and
stream the first version of multimedia content via the established evolved packet system bearer channel.

* * * * *